(12) United States Patent
Kumkar

(10) Patent No.: US 7,542,501 B2
(45) Date of Patent: Jun. 2, 2009

(54) LASER SYSTEM COMPRISING A NUMBER OF LONGITUDINALLY PUMPED LASER-ACTIVE SOLID BODIES

(75) Inventor: Malte Kumkar, Weimar (DE)

(73) Assignee: TRUMPF Laser GmbH + Co. KG, Schramberg (DE)

(*) Notice: Subject to any disclaimer, the term of this patent is extended or adjusted under 35 U.S.C. 154(b) by 0 days.

(21) Appl. No.: 11/999,736

(22) Filed: Dec. 5, 2007

(65) Prior Publication Data

US 2008/0175296 A1  Jul. 24, 2008

Related U.S. Application Data

(63) Continuation of application No. PCT/EP2006/005528, filed on Jun. 9, 2006.

(30) Foreign Application Priority Data

Jun. 10, 2005  (DE) .................. 10 2005 028 131

(51) Int. Cl.
*H01S 3/091* (2006.01)
(52) U.S. Cl. .................. 372/70; 372/69; 372/71
(58) Field of Classification Search ............. 372/70, 372/69
See application file for complete search history.

(56) References Cited

U.S. PATENT DOCUMENTS

| 5,237,584 A | 8/1993 | Shannon et al. |
| 5,446,749 A * | 8/1995 | Nighan et al. .................. 372/22 |
| 5,455,838 A | 10/1995 | Heritier et al. |
| 6,137,820 A * | 10/2000 | Maag et al. .................. 372/108 |
| 6,327,291 B1 | 12/2001 | Marshall |
| 6,393,034 B1 | 5/2002 | Konno et al. |
| 6,606,338 B1 * | 8/2003 | Kraenert et al. .................. 372/93 |
| 2004/0170205 A1 | 9/2004 | Konno et al. |
| 2005/0069009 A1 | 3/2005 | Knappe et al. |

FOREIGN PATENT DOCUMENTS

| DE | 196 03 704 | 8/1996 |
| DE | 100 03 244 | 8/2000 |
| DE | 101 37 236 | 7/2002 |
| DE | 102 01 383 | 7/2003 |
| EP | 0 742 964 | 9/2003 |
| JP | 2002353546 | 12/2002 |
| WO | 97/07575 | 2/1997 |

* cited by examiner

*Primary Examiner*—Dung T Nguyen
(74) *Attorney, Agent, or Firm*—Lipsitz & McAllister, LLC

(57) ABSTRACT

The aim of the invention is to obtain a laser system with the highest possible power that operates as stably as possible. This object is achieved in the case of a laser system by the laser radiation field passing through at least two laser-active solid bodies of identical material disposed one following the other in the direction of its beam axis, by the pumping radiation guide being formed in such a way that it feeds into each of the solid bodies the first partial radiation field via one end face and the second partial radiation field via the other end face and by the pumping radiation guide being formed in such a way that a pumping power fed into each of the at least two solid bodies by the two partial radiation fields can be adjusted in such a way that the effects on the laser radiation field of thermal lenses produced by the pumping power in each of the at least two solid bodies are substantially identical.

32 Claims, 8 Drawing Sheets

LASER SYSTEM COMPRISING A NUMBER OF LONGITUDINALLY PUMPED LASER-ACTIVE SOLID BODIES

This application is a continuation of International application No. PCT/EP2006/005528 filed on Jun. 9, 2006.

This patent application claims the benefit of International application No. PCT/EP2006/005528 of Jun. 9, 2006 and German application No. 10 2005 028 131.1 of Jun. 10, 2005, the teachings and disclosure of which are hereby incorporated in their entirety by reference thereto.

BACKGROUND OF THE INVENTION

The invention relates to a laser system comprising a laser radiation field guide, in which a laser radiation field extends, at least one laser-active solid body, which is passed through by the laser radiation field and extends in the direction of a longitudinal axis between two mutually opposite end faces, a pumping radiation source for generating pumping radiation for the optical pumping of the laser-active solid body, and a pumping radiation guide, which divides the pumping radiation for pumping the solid body into a first and a second partial radiation field and which feeds the first partial radiation field into the solid body in a longitudinal direction via one end face and feeds the second partial radiation field into the solid body in a longitudinal direction via the other end face.

Laser systems of this type are known, for example, from DE 196 03 704 A1. Longitudinal pumping assemblies of this type allow the pumping power that can be fed in through each end face to be kept below the destruction threshold, but the available power is limited in the case of laser systems of this type.

It is therefore an object of the invention to obtain a laser system with the highest possible power that operates as stably as possible.

SUMMARY OF THE INVENTION

This object is achieved according to the invention in the case of a laser system of the type described at the beginning by the laser radiation field passing through at least two laser-active solid bodies of identical material disposed one following the other in the direction of its beam axis, by the pumping radiation guide being formed in such a way that it feeds into each of the solid bodies the first partial radiation field via one end face and the second partial radiation field via the other end face and by the pumping radiation guide being formed in such a way that a pumping power fed into each of the at least two solid bodies by the two partial radiation fields can be adjusted in such a way that the effects on the laser radiation field of thermal lenses produced by the pumping power in each of the at least two solid bodies are substantially identical.

The advantage of the solution according to the invention can be seen in that it offers a simple possible way of increasing the power by the use of two or more solid bodies, while at the same time stable operation of the laser system, in particular in a basic mode, is possible in spite of using a number of solid bodies.

This stable operation of the laser system is achieved by the effects on the laser radiation field of the thermal lenses produced by the pumping power in each of the at least two solid bodies not adversely affecting the beam quality of the laser radiation field, and consequently the beam quality of the output beam emitted, because they are substantially identical.

Furthermore, the advantage of the solution according to the invention can also be seen in that changes of the pumping radiation source, with regard to wavelength or power, which are always to be expected, in particular whenever the pumping radiation source is a laser diode or comprises laser diodes, do not substantially have an adverse effect on the beam quality of the laser radiation field, since they occur in the same way in each of the at least two thermal lenses forming, and consequently do not lead to any disturbance of the symmetries in the laser radiation field.

A particularly advantageous solution provides here that the partial radiation fields are fed into the respective solid body substantially parallel to its longitudinal axis, so that the partial radiation fields alone already cause the feeding in of the pumping power to be as optimum as possible.

It is particularly advantageous if the partial radiation fields are fed into the respective solid body substantially symmetrically in relation to the beam axis within said body.

A solution of this type makes it possible to achieve excitation of the solid body that is as undisturbed as possible in the rotational symmetry in relation to the beam axis, and consequently amplification of the laser radiation field that is correspondingly undisturbed, already by means of the optical pumping of the respective solid body.

To achieve excitation conditions that are as similar as possible in all the solid bodies, it is preferably provided that the first partial radiation fields have a substantially identical form of radiation field in each of the respective solid bodies.

Furthermore, it is provided that the second partial radiation fields have a substantially identical form of radiation field in each of the respective solid bodies.

It is consequently not absolutely necessary for the forms of radiation field of the first and second partial radiation fields to be identical. In principle it is sufficient for the radiation fields of the first form to be identical to one another and the radiation fields of the second form to be identical to one another.

With regard to the forming of a lens effect of the thermal lenses that is as similar as possible, it is particularly advantageous if the sum of the pumping powers fed into the respective solid body by the two partial radiation fields is approximately equal in each of the solid bodies.

This feature means that it is primarily a matter of the sum of the pumping powers present in each solid body, since this determines the thermal lens effect in first approximation. How this sum of the pumping powers is made up may in principle vary in each of the solid bodies.

It is advantageous in particular if in each of the solid bodies the first partial radiation fields are formed substantially identically with regard to their pumping power, in particular with regard to their spatial distribution of the pumping power.

Furthermore, it is advantageous if in each of the solid bodies the second partial radiation fields are formed substantially identically with regard to their pumping power, in particular with regard to their spatial distribution of the pumping power.

A solution that is suitable with regard to the spatial distribution of the pumping power provides that the first and second partial radiation fields in each of the solid bodies run substantially mirror-symmetrically in relation to an approximately central mirror plane of the solid body, in order to obtain the greatest possible symmetry in the optical pumping of the solid body.

A particularly advantageous solution provides that the ratio of the pumping power fed in by the first partial radiation field to the pumping power fed in by the second partial radiation field is substantially the same in each of the solid bodies, since the ratio of the thermal lenses in the solid bodies to one another is maintained even when there is a drop in power of one partial radiation field, for example due to a drop in power of the pumping radiation source feeding it. It is particularly advantageous if each of the two partial radiation fields entering each of these solid bodies feeds approximately the same pumping power into them, to achieve the most consistent possible conditions in the optical pumping of the solid bodies.

With regard to the polarization of the partial radiation fields, no more details have been specified in connection with the exemplary embodiments so far. So, one solution provides that the first and second partial radiation fields in each of the solid bodies have a defined relative polarization.

It is particularly advantageous if in each of the solid bodies both partial radiation fields have the same polarization. This allows in particular the polarization of the partial radiation fields to be adapted to a preferential direction of the polarization in the solid body.

With regard to the available pumping power, likewise no further details have been provided. The conditions according to the invention can be achieved particularly easily if the first partial radiation field for each solid body disposed in the laser radiation field guide originates from one pumping radiation source.

Furthermore, it is advantageous if the second partial radiation field for each solid body disposed in the laser radiation field guide originates from one pumping radiation source.

In principle, it would be conceivable to provide two different pumping radiation sources for the first and second partial radiation fields.

Another advantageous solution provides that the two partial radiation fields entering the respective solid body originate from the same pumping radiation source. That does not necessarily mean that the partial radiation fields entering each of the solid bodies must originate from the same pumping radiation source, but that this condition merely has to be satisfied for each individual one of the solid bodies.

For example, it would be conceivable in the case of such a solution that the two partial radiation fields for in each case at least two of the solid bodies originate from the same pumping radiation source and that, for example, another pumping radiation source is provided for a further two of the solid bodies.

Another solution provides that the laser system has two pumping units, each of which pumps at least two solid bodies with partial radiation fields from the same pumping radiation source.

However, it is particularly advantageous if all the partial radiation fields fed into the at least two solid bodies originate from a single pumping radiation source.

With regard to the generation of the individual partial radiation fields, no further details have been provided in connection with the exemplary embodiments described so far. In principle, the division of the pumping radiation into different partial radiation fields may take place, for example, by means of semi-transparent mirrors.

It is particularly advantageous, however, if the division of the pumping radiation into partial radiation fields takes place by means of polarizers with polarization-dependent transmission and reflection, since division of a pumping radiation field into partial radiation fields can be easily achieved by these and, on the other hand, the degree of division into the individual partial radiation fields can be easily adjusted.

A further advantageous solution provides that the adjustable division of the pumping power into the partial radiation fields takes place by means of the relative adjustment between a polarizer with polarization-dependent transmission and reflection and an adjustable polarization-influencing element.

With regard to the manner of optimum feeding of the partial radiation fields into the respective solid bodies, so far no further details have been provided. So, an advantageous solution provides that the partial radiation fields are fed into the respective solid bodies via folding mirrors of the resonator.

Furthermore, no further details on the forming of the solid bodies as such have been provided in connection with the explanation so far of the individual exemplary embodiments. So, an advantageous solution provides that the at least two solid bodies are formed identically.

Since, in the case of some solid bodies, the forming of the thermal lenses is not the only effect occurring as a result of the optical pumping, but an astigmatism caused by the thermal lens may also occur, it is preferably provided that the at least two solid bodies are disposed in relation to the laser radiation field in such a way that compensation for astigmatism caused by the respective thermal lens takes place. Astigmatism may be caused by a preferential direction in the solid body, a certain cooling geometry or a certain pumping profile.

Compensation for the astigmatism merely means here that the effects of the astigmatism are compensated to the extent to which they lead to a deviation of the laser radiation field from a cross-sectional form that is rotationally symmetrical in relation to the beam axis, so that the resonator radiation field has a cross-sectional form that is substantially rotationally symmetrical in relation to the beam axis.

Such compensation for the astigmatism may in principle also take place when a number of solid bodies are coupled.

With regard to a solution according to the invention that is as simple as possible for compensation for the astigmatism of thermal lenses, it has proven to be advantageous if in each case two of the solid bodies form a compensation pair and if the two solid bodies are disposed in relation to the laser radiation field in such a way that compensation for the astigmatism caused by their respective thermal lens takes place.

It is particularly advantageous if the solid bodies of a compensation pair are rotated with the principal axes of the astigmatism by 90° with respect to one another. The principal axes of the astigmatism may in this case be caused by the pumping profile, the cooling geometry or the crystal geometry in the solid body.

Furthermore, for the optimum optical excitation of solid bodies of this type, it is provided that the polarizing direction of the laser radiation field is adapted to a principal axis of the polarization of the respective solid body, so that the effects caused by the astigmatism occur in the same way in the portion of the laser radiation field passing through the respective solid body.

Suitably, the polarizing direction of the laser radiation field is in this case aligned parallel to the principal axis of the polarization of the respective solid body.

A particularly suitable solution with regard to the compensation for the astigmatism provides that the solid bodies of a compensation pair are disposed with their principal axes of the polarization rotated by 90° with respect to one another, so that the effects of the astigmatism of the thermal lens can be easily compensated with regard to its deviation from a cross-sectional form that is rotationally symmetrical in relation to the beam axis of the laser radiation field.

Suitably, in the case of such a solution, each solid body is pumped by a first and a second partial radiation field, the polarizing direction of which is aligned parallel to the principal axis of the polarization of the respective solid body.

However, there are not only solid bodies in which, in addition to the effect of the thermal lens, an astigmatism occurs but also solid bodies in which, in addition to the thermal lens, a birefringence caused by the latter also occurs.

For this reason, it is suitably provided in the case of a further advantageous embodiment that the at least two solid bodies are aligned in relation to the laser radiation field in such a way that compensation for a birefringence caused by the respective thermal lens takes place.

It is also suitably provided in such a case that in each case two of the solid bodies form a compensation pair and that the two solid bodies are disposed in relation to the laser radiation field in such a way that compensation for the respective thermal lens and the birefringence takes place.

Also in this case, compensation for the birefringence takes place only to the extent that the birefringence leads to deviations of a rotationally symmetrical setup of the laser radiation field with respect to the beam axis and of the uniform state of polarization over the beam cross-section, so that compensation for the birefringence caused by the respective thermal lens is to be understood as meaning that its effects on a rotationally symmetrical setup of the laser radiation field with respect to the beam axis and on a uniform state of polarization over the beam cross-section are compensated.

It is preferably thereby provided that the polarizing directions of the laser radiation field in one of the solid bodies are rotated by 90° in relation to the polarizing directions of the amplifier radiation field in the other of the solid bodies.

In the case of the solution according to the invention, there is the possibility that the laser radiation field guide is integrated in a resonator, so that the laser radiation field represents a resonator radiation field.

However, it is also conceivable to form a partial region of the laser radiation field guide, for example comprising one or two of the number of solid bodies, as a resonator, with a resonator radiation field forming, and to form the other part of the laser radiation field guide for amplifying the laser radiation from the resonator with an amplifier radiation field.

Further features and advantages of the invention are the subject of the following description and the pictorial representation of some exemplary embodiments.

DETAILED DESCRIPTION OF THE INVENTION

Figure 1:
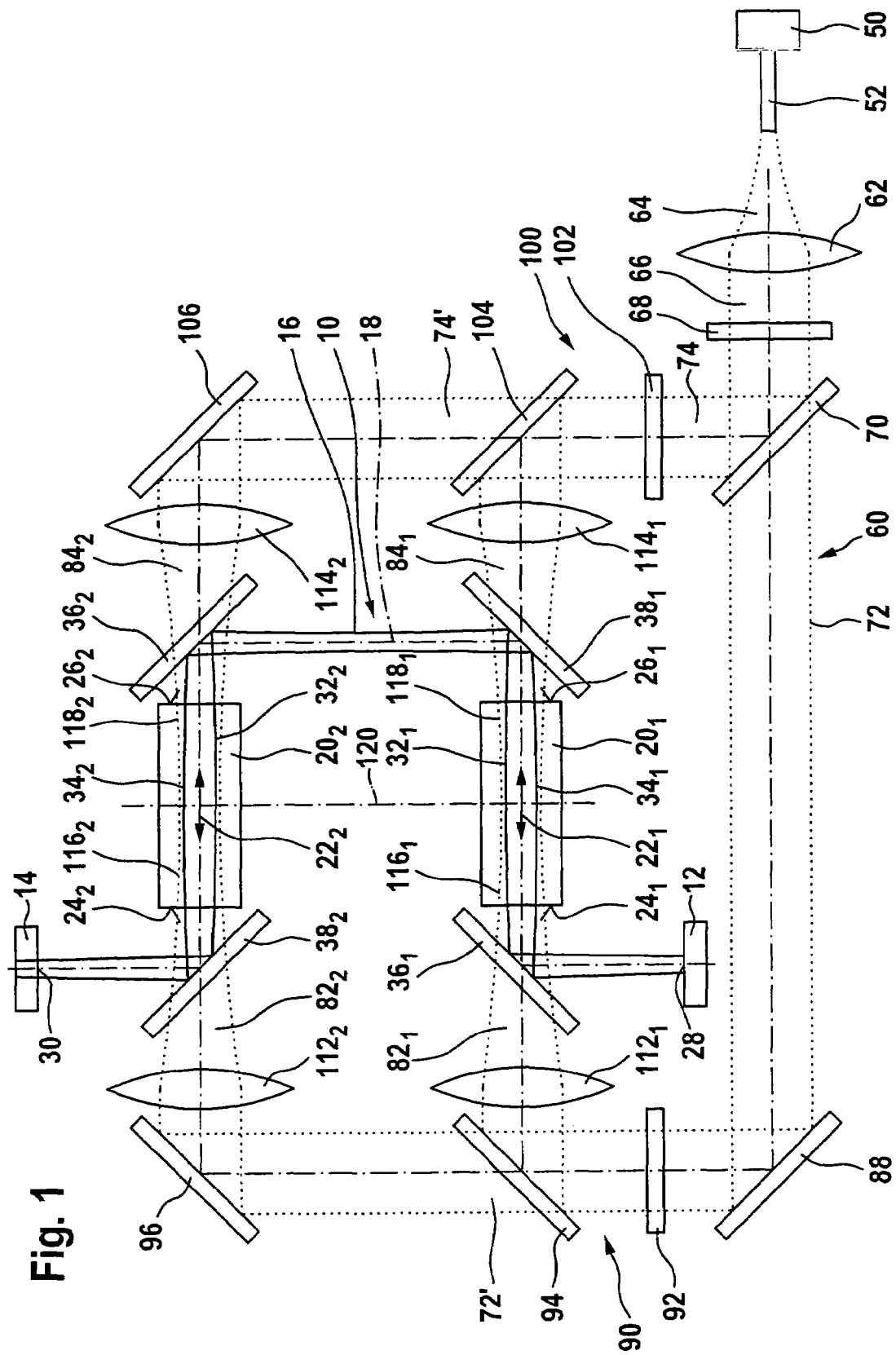
FIG. 1 shows a schematic representation of a first exemplary embodiment of a laser system according to the invention with the forming of thermal lenses in the solid bodies.

A first exemplary embodiment of a laser amplifier system according to the invention, represented in FIG. 1, comprises a resonator, which is designated as a whole by 10, represents a laser radiation field guide and has a first end mirror 12 and a second end mirror 14. Between these end mirrors 12 and 14 there extends along a beam axis 18 a laser radiation field designated as a whole by 16 and representing a resonator radiation field, the resonator radiation field 16 passing through a number of solid bodies 20, comprising laser-active material and following one after the other in the direction of the beam axis 18, in particular consisting of identical material and identically formed, for example the solid bodies $20_1$ and $20_2$, which extend with their longitudinal axes $22_1$ and $22_2$ approximately parallel to the path of the beam axis 18 in the solid bodies $20_1$ and $20_2$, respectively.

The resonator radiation field 16 thereby enters and leaves the solid bodies $20_1$ and $20_2$ via end faces $24_1$ and $26_1$ and end faces $24_2$ and $26_2$, respectively.

The resonator radiation field 16 is preferably formed such that it has in the region of the end mirrors 12 and 14 a respective waist 28 and 30, while between the end mirrors 12 and 14, for example in its portions $32_1$ and $32_2$ that respectively pass through the solid bodies $20_1$ and $20_2$, it respectively has a portion $34_1$ and $34_2$ with the maximum cross-section of the radiation field.

Furthermore, the resonator 10 also comprises for each of the solid bodies $20_1$ and $20_2$ a set of folding mirrors $36_1$ and $38_1$ and $36_2$ and $38_2$, respectively, which folds the resonator radiation field 16 by reflection.

Preferably, the resonator radiation field 16 is thereby folded in such a way that the portions $32_1$ and $32_2$ respectively running in the solid bodies $20_1$ and $20_2$ have substantially the same spatial geometrical form.

For the optical pumping, the pumping radiation source designated as a whole by 50 is provided, the pumping radiation of which is fed either directly or through a light guide 52 to a pumping radiation guide designated as a whole by 60.

The pumping radiation guide 60 has an optical system 62, which transforms divergent pumping radiation 64 emerging from the light guide 52 into a collimated pumping radiation field 66, which undergoes complete depolarization by a depolarizer 68. This collimated and depolarized pumping radiation field is divided by a polarizer 70, which is substantially transparent for one of the polarizing directions and substantially reflecting for another of the polarizing directions, into a first pumping radiation field branch 72 with a first polarization and a second pumping radiation field branch 74 with a second polarization, perpendicular to the first polarization, a first partial radiation field $82_1$ for the first solid body $20_1$ and a first partial radiation field $82_2$ for the second solid body $20_2$ being respectively generated from the first pumping radiation field branch 72, while a second partial radiation field $84_1$ for the first solid body $20_1$ and a second partial radiation field $84_2$ for the second solid body $20_2$ is respectively generated from the second pump radiation field branch 74.

For this purpose, the first pumping radiation field branch 72 is, for example, deflected by a reflector 88 and the partial radiation field $82_1$ is divided off by means of a dividing unit 90, comprising a polarization-influencing element 92 and a polarizer 94, which is substantially transparent for one of the polarizing directions and substantially reflecting for another of the polarizing directions.

Consequently, after passing through the dividing unit 90, the first pumping radiation field branch 72' continues with reduced pumping power and then, after reflection by a reflector 96, forms the partial radiation field $82_2$.

In a comparable way, a second pumping radiation field branch 74 also passes through a dividing unit 100, comprising a polarization-influencing element 102 and a polarizer 104, which is substantially transparent for one of the polarizing directions and substantially reflecting for another of the polarizing directions and branches off the partial radiation field $84_1$ from the second pumping radiation field branch 74, so that, after passing through the dividing unit 100, the second pumping radiation field branch 74' has a reduced pumping power and, after reflection by a reflector 106, forms the partial radiation field $84_2$.

To achieve a defined form of radiation field of the partial radiation fields $82_1$ and $84_1$, entering the first solid body $20_1$, and of the partial radiation fields $82_2$ and $84_2$, entering the second solid body $20_2$, an imaging optical system $112_1$ and $114_1$ and $112_2$ and $114_2$ is respectively provided for each of the partial radiation fields $82_1$ and $84_1$ and $82_2$ and $84_2$, which system generates a defined form of radiation field $116_1$ and $118_1$, respectively, of the partial radiation fields $82_1$ and $84_1$ in the first solid body $20_1$ and also a defined form of radiation field $116_2$ and $118_2$, respectively, in the second solid body $20_2$.

Preferably, the spatial forms of radiation field $116_1$ and $116_2$ of the first partial radiation fields $82_1$ and $82_2$, respectively, and the spatial forms of radiation field $118_1$ and $118_2$ of the second partial radiation fields $84_1$ and $84_2$, respectively, are in each case identical.

It is still more advantageous if all the forms of radiation field $116_1$ and $118_1$ as well as $116_2$ and $118_2$ are substantially identical and, preferably, the forms of radiation field $116_1$ and $118_1$ of the partial radiation fields $82_1$ and $84_1$ that act together in the first solid body $20_1$ for the pumping of the laser-active material are identical to one another and mirror-symmetrical in relation to a plane of symmetry 120.

The same applies to the forms of radiation field $116_2$ and $118_2$ of the partial radiation fields $82_2$ and $84_2$ for the optical pumping of the second solid body $20_2$.

To be able to feed in the partial radiation fields $82_1$ and $84_1$ as well as $82_2$ and $84_2$ in the case of the respective solid body $20_1$ or $20_2$ substantially parallel to the path of the beam axis 18 of the resonator radiation field 16 in the respective solid body $20_1$ or $20_2$, the feeding in of the partial radiation fields $82_1$ and $84_1$ and $82_2$ and $84_2$, respectively, takes place via the set of folding mirrors $36_1$ and $38_1$ and $36_2$ and $38_2$ associated with the respective solid body $20_1$ or $20_2$, to be precise in such a way that the folding mirrors 36, 38 are transparent for the partial radiation fields 82 and 84.

The fact that the degree of the division of the optical power between the partial radiation field $82_1$ and the remaining pumping radiation field branch 72' by the first dividing unit 90 or the degree of division of the pumping power between the partial radiation field $84_1$ and the remaining second pumping radiation field branch 74' is adjustable means that there is the possibility of adjusting the pumping power that is fed into the first solid body $20_1$ by the two partial radiation fields $82_1$ and $84_1$ and the pumping power that is fed into the second solid body $20_2$ by the partial radiation fields $82_2$ and $84_2$.

Figure 2:
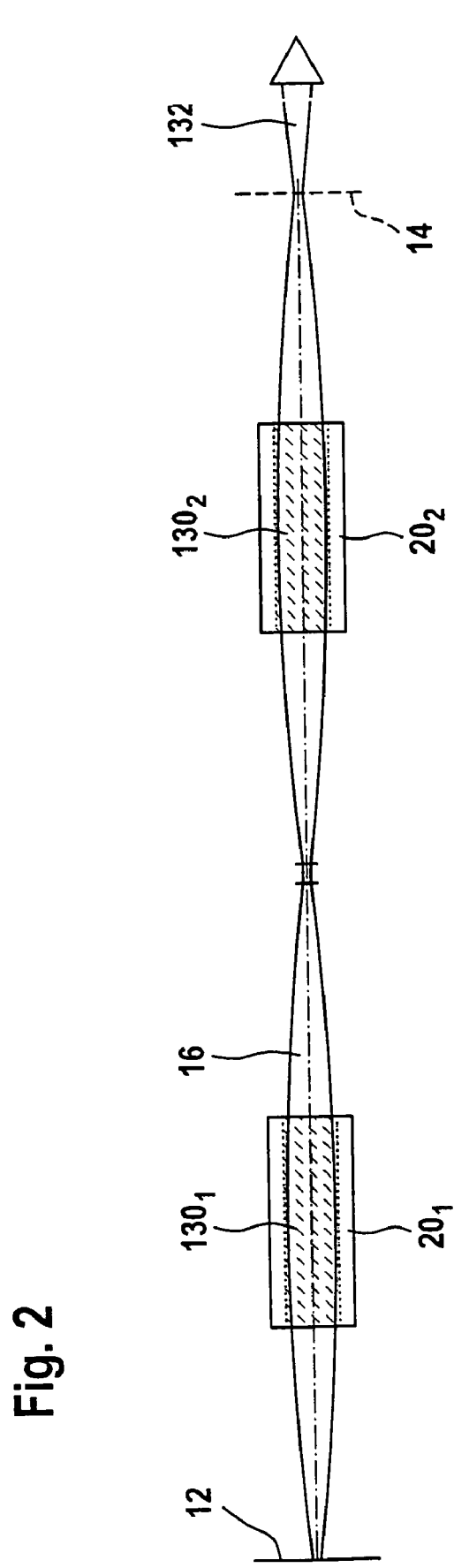
FIG. 2 shows a schematic representation of the effects of the thermal lenses forming in the solid bodies in the case of the first exemplary embodiment.

As schematically represented in FIG. 2, on account of the heating up of the material in the respective solid body $20_1$ or $20_2$, the pumping power fed into said respective solid bodies $20_1$ and $20_2$ leads to the formation of a thermal lens $130_1$ and $130_2$, respectively, which has an effect on the resonator radiation field 16.

With the solution according to the invention, there is now the possibility of adjusting the overall pumping power that is respectively fed into the first solid body $20_1$ and into the second solid body $20_2$ with regard to its absolute value and its spatial distribution in such a way that the resulting thermal lenses $130_1$ and $130_2$ are identical and consequently always have the same effect on the resonator radiation field 16, so that the resonator radiation field 16 is a symmetrical resonator radiation field 16, as represented in FIG. 2.

By adaptation of the pumping power of the single pumping radiation source 50, the thermal lenses $130_1$ and $130_2$ can be varied, while maintaining the distribution, in order in this way to adjust the desired path of the resonator radiation field 16 easily while maintaining the symmetry of the resonator radiation field 16.

The pumping radiation guide 60 according to the invention, fed with pumping radiation from a single pumping radiation source 50, has in this case the advantage that, even if the pumping radiation source 50 changes, for example with regard to the wavelength of the pumping radiation or the power of the pumping radiation, although the thermal lenses $130_1$ and $130_2$ produced in the solid bodies $20_1$ and $20_2$ likewise change, they remain identical, so that the symmetry of the resonator radiation field 16 can be maintained, and consequently the resonator 10 as a whole, if of a suitable type of construction, continues to operate as before in optimum accord with the mode which has been set, for example the basic mode, so that the beam quality of a usable beam 132, emerging for example through the end mirror 14, remains unchanged even though the pumping radiation emitted by the pumping radiation source 50 has changed, for example with regard to its wavelength and/or its power.

However, it would also be conceivable to feed the first pumping radiation field branch 72 from a first pumping radiation source and the second pumping radiation branch 74 from a second pumping radiation source. In this case, the ratio of the pumping power fed in from the first partial radiation field 82 to the pumping power fed in from the second partial radiation field 84 should be the same in each of the solid bodies 20.

Figure 3:
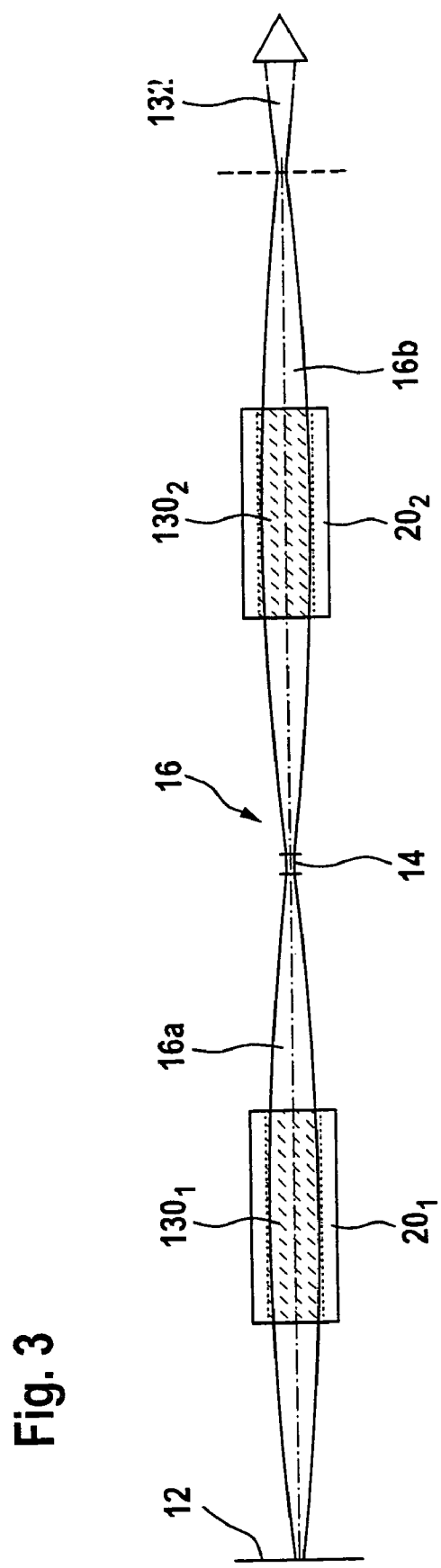
FIG. 3 shows a schematic representation similar to FIG. 2 of a variant of the first exemplary embodiment, comprising a resonator radiation field and an amplifier radiation field.

As an alternative to this, however, it is also possible, as represented in FIG. 3, to use the two solid bodies $20_1$ and $20_2$ to construct a resonator-amplifier assembly, the solid body $20_1$ being passed through by the resonator radiation field 16a and the solid body $20_2$ being passed through by the amplifier radiation field 16b, but the symmetry of the thermal lenses $130_1$ and $130_2$ remaining and the laser radiation field 16 being mirror-symmetrical in relation to the end mirror 14.

Figure 4:
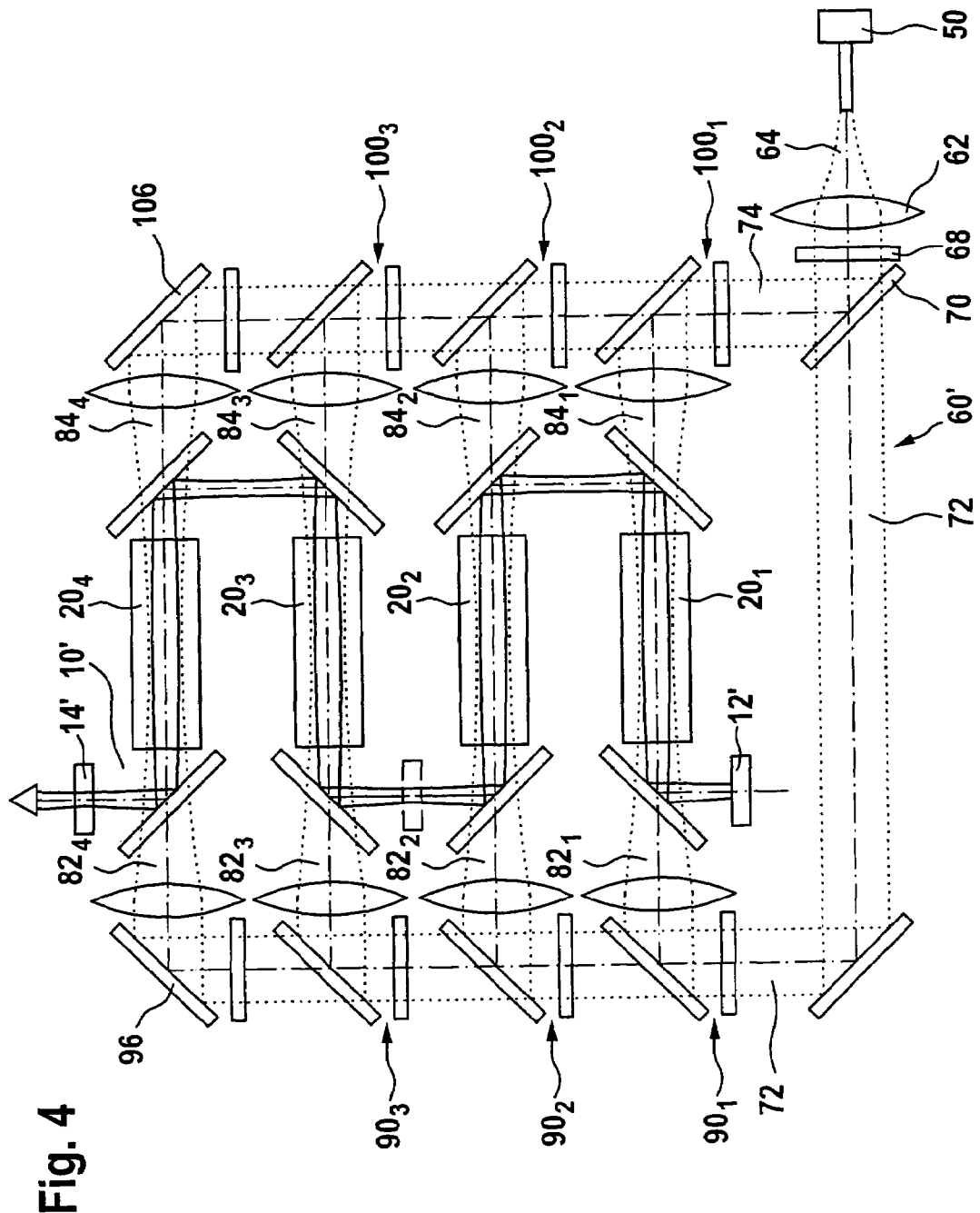
FIG. 4 shows a schematic representation of a second exemplary embodiment of a laser system according to the invention with more than two solid bodies.

The solution according to the invention is not restricted to two solid bodies $20_1$ to $20_2$ but can, as represented in FIG. 4, be extended to a plurality of solid bodies $20_1$ to $20_4$ or even more solid bodies 20.

For this purpose, the pumping radiation guide 60' is to be modified in such a way that, of the pumping radiation field branches 72 and 74, the pumping radiation field branch 72 is divided into a total of four partial radiation fields $82_1$, $82_2$, $82_3$ and $82_4$, which preferably all have substantially the same pumping power, by multiple provision of dividing units 90, 100, for example dividing units $90_1$, $90_2$ and $90_3$ as well as $100_1$, $100_2$ and $100_3$.

In the same way, the second pumping radiation field branch 74 is divided by the dividing units $100_1$, $100_2$ and $100_3$ into a total of four partial radiation fields $84_1$ to $84_4$, so that altogether these likewise all have substantially the same pumping power.

This allows thermal lenses 130 that are substantially identical also to be produced in the total of four solid bodies $20_1$ to $20_4$, so that the symmetrical conditions represented in FIG. 2 for the resonator radiation field 16 can also be extended to four solid bodies $20_1$ to $20_4$.

Should the pumping power dependence of the total of four solid bodies $20_1$ to $20_4$ not be ideally identical, the adjustable division of the pumping power field branches 72, 74 into the partial radiation fields 82, 84 allows an adaptation to be achievable with the nevertheless substantially identical thermal lenses in the four solid bodies $20_1$ to $20_4$.

Figure 5:
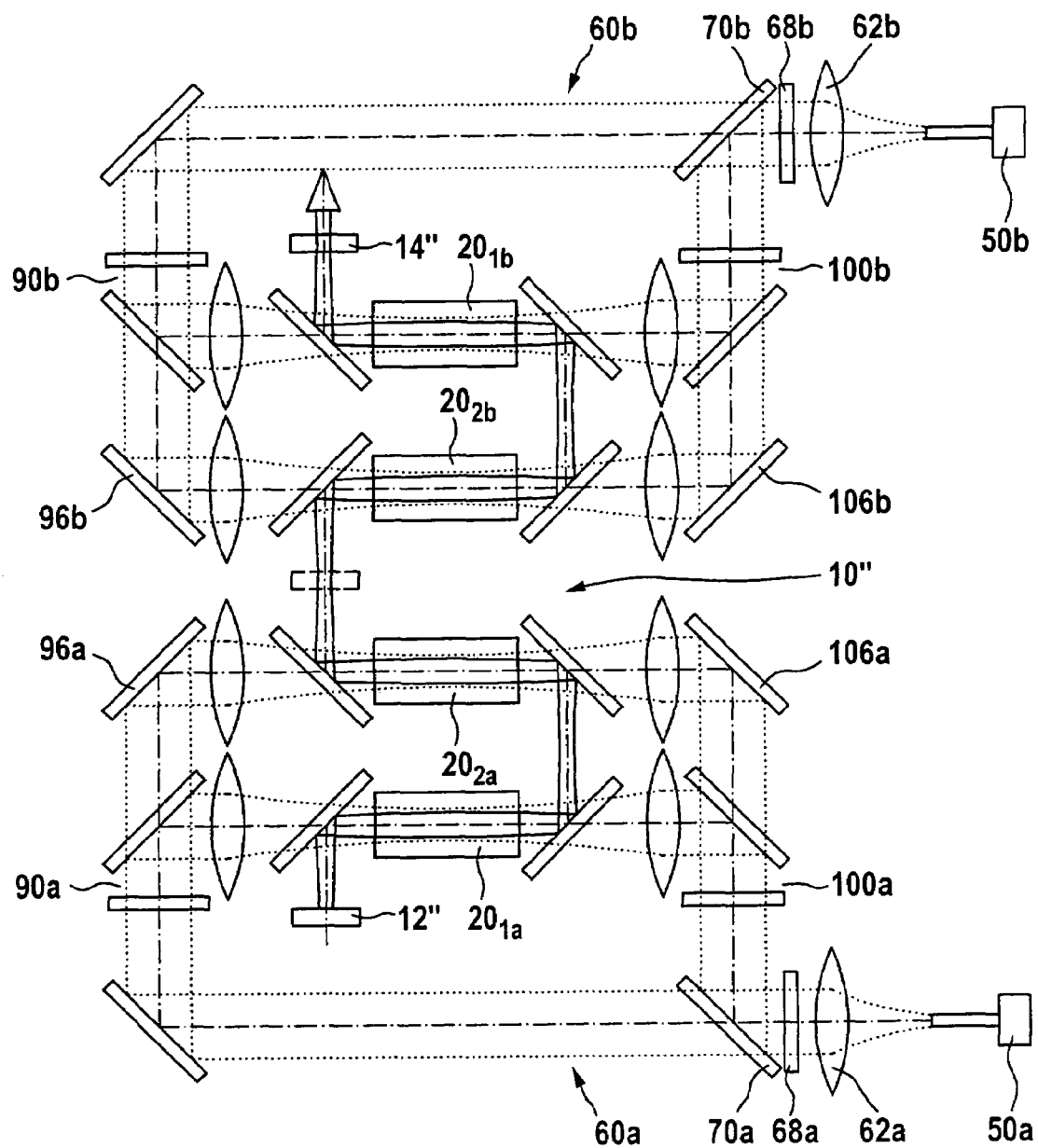
FIG. 5 shows a schematic representation of a third exemplary embodiment of a laser system according to the invention with more than two solid bodies.

In the case of a third exemplary embodiment of a laser system according to the invention, represented in FIG. 5, likewise a total of four solid bodies, namely $20_{1a}$, $20_{2a}$, $20_{1b}$ and $20_{2b}$, are provided in a resonator 10", the solid bodies $20_{1a}$ and $20_{2a}$ being pumped by a pumping radiation guide 60a in a way corresponding to the first exemplary embodiment, while the solid bodies $20_{1b}$ and $20_{2b}$ are pumped by likewise a pumping radiation guide 60b according to the first exemplary embodiment, and each of the pumping radiation guides 60a and 60b has its own pumping radiation source 50a and 50b, respectively.

With the pumping radiation guides 60a and 60b, it can at least be achieved that the thermal lenses 130 in the solid bodies $20_{1a}$ and $20_{2a}$ are identical, and likewise the thermal lenses in the solid bodies $20_{1b}$ and $20_{2b}$ are substantially identical, but a disturbance of the symmetry can occur to the effect that the thermal lenses of the solid bodies $20_{1a}$ and $20_{2a}$ are different relative to the thermal lenses of the solid bodies $20_{1b}$ and $20_{2b}$.

Figure 6:
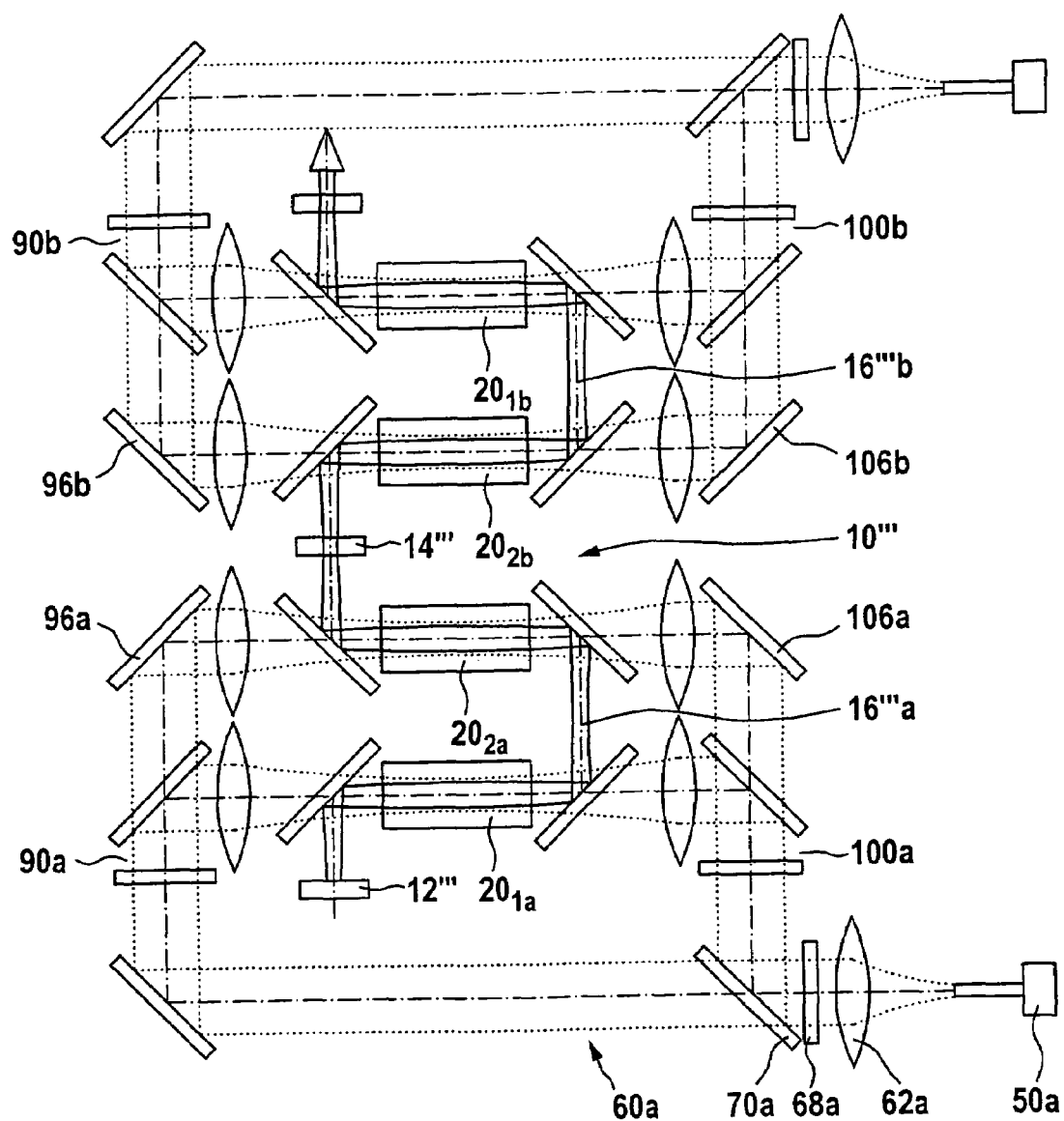
FIG. 6 shows a schematic representation of a fourth exemplary embodiment of a laser system according to the invention with more than two solid bodies.

In the case of a fourth exemplary embodiment, represented in FIG. 6, the way in which the pumping radiation guides 60a and 60b are formed and disposed corresponds to the third exemplary embodiment according to FIG. 5.

However, the laser radiation field guide 10''' is only formed as a resonator in the region passing through the solid bodies $20_{1a}$ and $20_{2a}$, so that the end mirror 14''' is also followed by a region formed as an amplifier, which comprises the solid bodies $20_{1b}$ and $20_{2b}$.

Consequently, the laser radiation field 16''' is divided altogether into a region forming a resonator radiation field 16'''a and a region forming an amplifier radiation field 16'''b.

Consequently, the solid bodies $20_{1a}$ and $20_{2a}$ form a pair and the solid bodies $20_{1b}$ and $20_{2b}$ form a pair, the symmetry according to FIG. 2 being maintained for each pair by adjusting the pumping power and this adjustment being simplified by the balancing of the pumping power within the pairs.

With regard to the other elements, the second, third and fourth exemplary embodiments are formed and constructed in the same way as the first exemplary embodiment, so that, as far as the explanation of these elements and their function is concerned, reference is made to the statements made with respect to the first exemplary embodiment in their entirety.

In connection with the exemplary embodiments described so far, only the effects of the thermal lenses produced by the pumping power have been described. However, as represented in FIG. 7, in addition to the thermal lenses 130, it is possible for an astigmatism of the thermal lenses to occur in the case of a laser system corresponding to the first exemplary embodiment, that is to say that, as represented in FIG. 7, the thermal lenses $130'_1$ and $130'_2$ produced in the solid body $20_1$ and in the solid body $20_2$ by the optical pumping are not rotationally symmetrical in relation to the beam axis 18.

This may be caused by an unsymmetrical cooling geometry of the solid bodies $20_1$, $20_2$ or unsymmetrical partial radiation fields 82, 84. However, there are also anisotropic solid body materials, which have an astigmatic thermal lens effect even when there is symmetrical cooling and symmetrical partial radiation fields 82, 84. Materials of this type are, for example, Nd:YLF or Nd:YVO$_4$.

Figure 7:
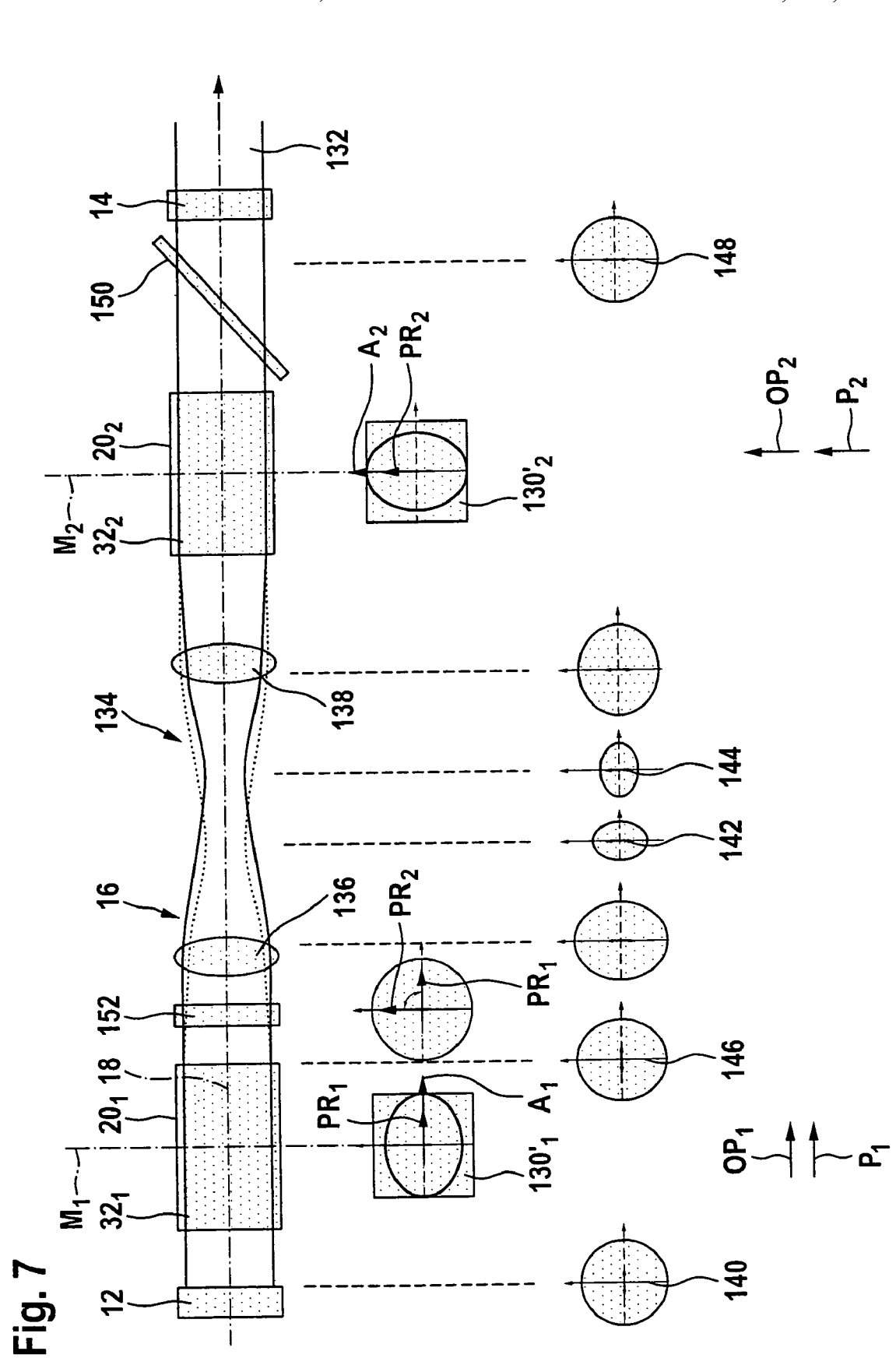
FIG. 7 shows a schematic representation of the first exemplary embodiment with additional representation of compensation for astigmatism caused by the thermal lens effect.

As represented in FIG. 7, each of the solid bodies $20_1$ and $20_2$ has a principal axis $A_1$ and $A_2$, respectively, of the astigmatism, which in the case of an astigmatism caused by the crystal axes correspond to the principal axes of the polarization $P_1$, $P_2$. This principal axis $A_1$, $A_2$ of the astigmatism has the result that the focusing effect of the thermal lenses $130'_1$ and $130'_2$ respectively occurring in the direction of this principal axis $A_1$ or $A_2$ is greater than perpendicularly to this respective principal axis $A_1$ or $A_2$. On the basis of a round cross-section 140 of the resonator radiation field 16 in the region of the end mirror 12, this has the result on passing through the solid body $20_1$, as represented in FIG. 7, that the resonator radiation field 16 is focused more strongly in the direction of the principal axis $A_1$, as represented by dashed lines in FIG. 7, so that the resonator radiation field 16 forms a first beam waist 142 in the principal axis $A_1$ and a second beam waist 144 in the direction perpendicular to the principal axis $A_1$, at a relatively great distance from the first solid body $20_1$.

On account of the astigmatism of the thermal lens $130'_1$, after passing through the solid body $20_1$, the resonator radiation field 16 has altogether with respect to the beam axis 18 a cross-sectional form that is no longer rotationally symmetrical, as shown for example by the cross-sectional form 146 of the resonator radiation field 16 after passing through the solid body $20_1$ and by the cross-sectional form of the beam waists 142 and 144 and by their distance from one another in the direction of the beam axis 18.

Furthermore, to obtain imaging of the portion $32_1$ of the resonator radiation field 16 in the first solid body $20_1$ into the portion $32_2$ of the resonator radiation field 16 in the solid body $20_2$ that is optimum to compensate for the astigmatism, an imaging optical system 134 is provided between the solid bodies $20_1$ and $20_2$ forming a compensation pair, which system comprises two imaging optical systems 136 and 138 and forms, in a plane $M_2$ of the solid body $20_2$, an image of a plane $M_1$ which runs perpendicularly in relation to the beam axis 18 in the first solid body $20_1$, the plane $M_2$ likewise running perpendicularly in relation to the beam axis 18 in the body $20_2$, and vice versa.

To compensate for this no longer rotationally symmetrical deformation of the resonator radiation field 16, the solid bodies $20_1$ and $20_2$ are disposed with their principal axes of the astigmatism $A_1$, $A_2$ in such a way that they are rotated by 90° with respect to one another, as represented in FIG. 7.

Disposing the solid bodies $20_1$ and $20_2$ in this way has the effect that, after passing through the first solid body $20_1$, when the resonator radiation field 16 passes through the second solid body $20_2$ it once again "sees" an astigmatism, which however is tilted by 90°, since the principal axis $A_2$ of the astigmatism in the second solid body $20_2$ has been rotated.

If then the effect of the thermal lens $130'_1$ is equal to the effect of the thermal lens $130'_2$, but with an astigmatism that is rotated by 90° between the thermal lenses $130'_1$ and $130'_2$, effects of the astigmatism of the thermal lenses $130'_1$ and $130'_2$ are compensated in such a way that the resonator radiation field 16 at the end mirror 14 once again has a substantially round cross-sectional form 148.

In the explanation so far of the compensation for the astigmatism caused by the thermal lens effect, no further details have been provided of the polarization of the resonator radiation field 16 itself.

If the astigmatism of the thermal lens 130 is independent of the polarization radiated in and if the polarization is not influenced by the thermal lenses 130, a linear polarization can be chosen by means of the polarizer 150 independently of the principal axes $A_1$, $A_2$ of the astigmatism.

The astigmatism of the thermal lenses 130 is often linked with a preferential direction of the polarization $P_1$, $P_2$ in the solid body. In FIG. 7, for example, it is assumed that the polarizer 150 prefers a polarizing direction PR of the resonator radiation field at the output mirror 14 that coincides both with the preferential direction of the polarization $P_2$ of the solid body $20_2$ and with a principal axis of the astigmatism $A_2$ that is linked with this polarizing direction.

As represented in FIG. 7, the polarizer 150 has the effect that the output beam 132 emitted from the resonator radiation field 16 is polarized in such a way that there is a constant phase relationship over the cross-section of the same between mutually perpendicular polarization components.

In the simplest case, this is achieved by a linear polarization of the resonator radiation field 16.

To compensate for the astigmatism when using solid bodies 20 with a preferential direction of the polarization $P_1$, $P_2$ that coincides with a principal axis of the astigmatism $A_1$, $A_2$ of the thermal lens 130, the polarizing direction PR of the resonator radiation field 16 is to be aligned such that it coincides with the principal axis P of the polarization in the respective solid body $20_1$ or $20_2$ (FIG. 7).

For this reason, in the first solid body $20_1$ the polarization $PR_1$ of the resonator radiation field 16 is to be aligned such that it runs parallel to the principal axis $P_1$ and $A_1$ and in the second solid body $20_2$ the polarization $PR_2$ of the resonator radiation field 16 is to be aligned such that it runs parallel to the principal axis $P_2$ and $A_2$.

For rotating or reflecting the polarization PR of the resonator radiation field 16 to a perpendicular direction, a polarization-influencing element 152 is to be provided between the solid bodies $20_1$ and $20_2$, which element changes the polarization $PR_1$ of the resonator radiation field 16 in the region of the first solid body $20_1$ into the polarizing direction $PR_2$ before the resonator radiation field 16 passes through the second solid body $20_2$, and vice versa.

With respect to the optical excitation of the solid bodies $20_1$ and $20_2$, so far no further details have been provided. So, the optical excitation of the first solid body $20_1$ is suitably performed with a polarization $OP_1$, which is aligned in the same direction as the preferential direction of the polarization $P_1$, $P_2$. A suitable alignment provides that the polarization $OP_1$ runs parallel to the principal axis $P_1$, both partial radiation fields $82_1$ and $84_1$ being polarized parallel to the direction $OP_1$.

By contrast with this, an excitation of the solid body $20_2$ is performed with a polarization $OP_2$, which is aligned in the same direction as the preferential direction of the polarization, in particular runs parallel to the principal axis $P_2$, the partial radiation fields $82_2$ and $84_2$ also in this case being polarized parallel to the polarization $OP_2$.

In the case of solid bodies 20 of another type, there is no preferential direction of the polarization along the direction of the resonator radiation field 16. In the case of such solid bodies, the thermal lenses $130''_1$ and $130''_2$ still additionally comprise a birefringence, for example a rotationally symmetrical stress-induced birefringence, in the case of which a radial polarization component RP and an azimuthal polarization component AP are of different magnitudes.

Figure 8:
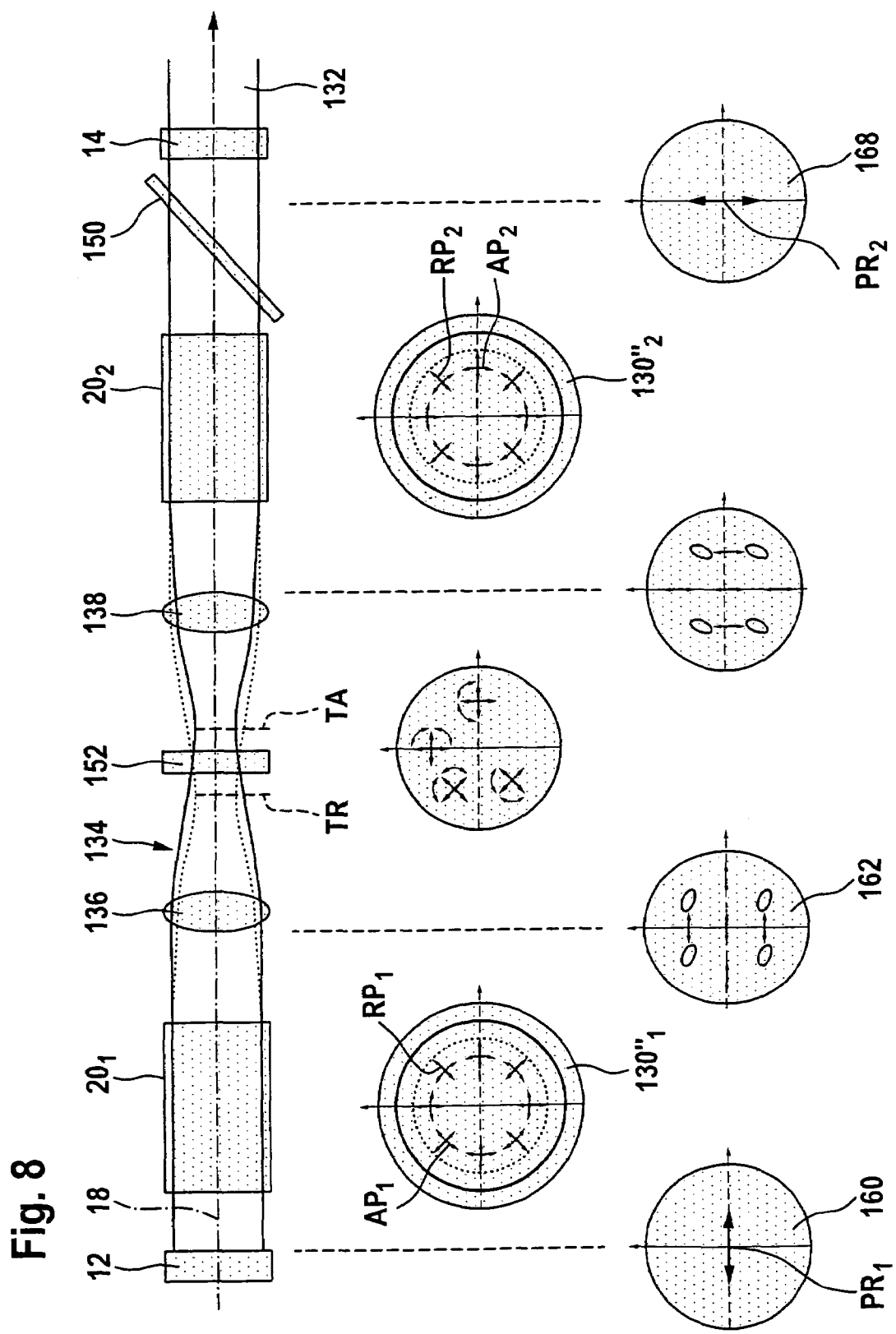
FIG. 8 shows a schematic representation similar to FIG. 5 of the first exemplary embodiment in the case of compensation for birefringence caused by the thermal lens.

As represented in FIG. 8 in the case of a laser system corresponding to the first exemplary embodiment, the thermal lens 130, of the solid body $20_1$ has a principal axis of the birefringence in the direction of the radial polarization $RP_1$ and a further principal axis of the birefringence in the direction of the azimuthal polarization $AP_1$. The alignment of these principal axes is unvarying in a system of cylindrical coordinates, locationally dependent with respect to a system of Cartesian coordinates. A solid body material that exhibits such behavior is, for example, Nd:YAG.

The refractive power of the thermal lens is consequently of different magnitudes for the polarization components $RP_1$ and $AP_1$. Furthermore, the state of polarization of a laser radiation field 16 generally changes on passing through the respective solid body 20 with the described birefringence, since a phase shift occurs between the two polarization components oriented along the principal axes of the birefringence. That means in this example that, for each laser radiation field 16 whose polarization is not aligned purely azimuthally or purely radially over the beam cross-section, a change in the state of polarization takes place on passing through the solid body 20, this change not being constant over the cross-section.

For example, on account of the stress-induced birefringence, the radial polarization component $RP_1$ is focused more strongly than the azimuthal polarization component $AP_1$.

Linked with this is an increased phase velocity of the radial polarization component as compared with the azimuthal polarization component, which results in a change in the phase relationship between the polarization components on passing through the solid body.

The different focusing of the radial and azimuthal polarization components has the effect that their beam waists are disposed at different points TR and TA in the direction of the beam axis 18.

Also in the case of this exemplary embodiment, the aim is to obtain an output beam 132 with a rotationally symmetrical cross-sectional form that has a fixed phase relationship between mutually perpendicular polarization components, a linear polarization being ensured here by the polarizer 150.

If a linear polarization $PR_1$ and $PR_2$ and a rotationally symmetrical cross-sectional form 160 and 168 of the resonator radiation field 16 are assumed in the region of the end mirrors 12 and 14, respectively, of the resonator 10, the birefringence of the thermal lens $130''_1$ in the solid body $20_1$ leads to an elliptical polarization of the resonator radiation field 16 outside the principal axis coinciding with the polarizing direction $PR_1$, as represented by the cross-sectional form 162.

It is therefore necessary to compensate for this elliptical polarization of the resonator radiation field 16 outside the principal axes $RP_1$ and $AP_1$ coinciding with the polarizing direction $PR_1$ as well as the different focusing that is obtained for the different polarization components $RP_1$ and $AP_1$.

For this reason, the polarization-rotating element 152 is provided in the region of the imaging optical system 134 that is present for the same reasons as in the case of the correction of the astigmatism, which element rotates each polarization component RP and AP of the resonator radiation field 16 by 90°, so that a radial polarization component $RP_1$ of the resonator radiation field 16 that is focused more strongly in the solid body $20_1$ and has a higher phase velocity than the azimuthal polarization $AP_1$ undergoes the weaker focusing and lower phase velocity in the solid body $20_2$ as polarization component $AP_2$, while an azimuthal polarization component $AP_1$ of the resonator radiation field 16 that is focused less in the solid body $20_1$ and has a higher phase velocity than the radial polarization $RP_1$ undergoes the stronger focusing and higher phase velocity in the solid body $20_2$ as polarization component $RP_2$.

The resonator radiation field 16 is then made up of the components AP and RP and, as a result, each component of the resonator radiation field 16 undergoes in one solid body 20 the effect for the polarization component AP and in the other solid body 20 undergoes the effect for the polarization component RP. Taken together, the effect of the birefringence in all parts can cancel out over the overall beam cross-section, and consequently compensation for the birefringence can largely be achieved. The exemplary embodiment according to the invention allows the compensation for the birefringence to be obtained by the birefringence that is caused by the thermal lens 130 being adjusted such that it is largely identical in the two solid bodies by suitably dividing the pumping power between the solid bodies $20_1$ and $20_2$.

Solid bodies of this type, in which the stress-induced birefringence associated with the thermal lens 130" dominates the birefringence, are optically largely isotropic if thermally and mechanically induced effects are ignored, so that the polarizing direction during the optical pumping of the solid bodies $20_1$ and $20_2$ is of no significance. In the case of this exemplary embodiment, optical pumping of the solid bodies $20_1$ and $20_2$ is therefore possible with each polarizing direction, but the optical pumping in the case of this exemplary embodiment should also be such that the thermal lenses $130"_1$ and $130"_2$ are of the same magnitude, as described in connection with the first exemplary embodiment.

The invention claimed is:

1. Laser system comprising a laser radiation field guide, in which a laser radiation field extends, at least one laser-active solid body, which is passed through by the laser radiation field and extends in the direction of a longitudinal axis between two mutually opposite end faces, a pumping radiation source for generating pumping radiation for the optical pumping of the laser-active solid body, and a pumping radiation guide, which divides the pumping radiation for pumping the solid body into a first and a second partial radiation field and which feeds the first partial radiation field into the solid body in a longitudinal direction via one end face and feeds the second partial radiation field into the solid body in a longitudinal direction via the other end face, the laser radiation field passing through at least two laser-active solid bodies of identical material disposed one following the other in the direction of its beam axis, the pumping radiation guide being formed in such a way that it feeds into each of the solid bodies the first partial radiation field via one end face and the second partial radiation field via the other end face and the pumping radiation guide being formed in such a way that a pumping power fed into each of the at least two solid bodies by the two partial radiation fields can be adjusted in such a way that the effects on the laser radiation field of thermal lenses produced by the pumping power in each of the at least two solid bodies are substantially identical.

2. Laser system according to claim 1, wherein the partial radiation fields are fed into the respective solid body substantially parallel to its longitudinal axis.

3. Laser system according to claim 1, wherein the partial radiation fields are fed into the respective solid body substantially symmetrically in relation to the beam axis within said body.

4. Laser system according to claim 1, wherein the first partial radiation fields have a substantially identical form of radiation field in each of the respective solid bodies.

5. Laser system according to claim 1, wherein the second partial radiation fields have a substantially identical form of radiation field in each of the respective solid bodies.

6. Laser system according to claim 1, wherein the sum of the pumping powers fed into the respective solid body by the two partial radiation fields is approximately equal in each of the solid bodies.

7. Laser system according to claim 1, wherein in each of the solid bodies the first partial radiation fields are formed substantially identically with regard to their pumping power.

8. Laser system according to claim 1, wherein in each of the solid bodies the second partial radiation fields are formed substantially identically with regard to their pumping power.

9. Laser system according to claim 1, wherein the first and second partial radiation fields in each of the solid bodies run substantially mirror-symmetrically in relation to an approximately central mirror plane of the solid body.

10. Laser system according to claim 1, wherein the ratio of the pumping power fed in by the first partial radiation field to the pumping power fed in by the second partial radiation field is substantially the same in each of the solid bodies.

11. Laser system according to claim 1, wherein the first and second partial radiation fields in each of the solid bodies have a defined relative polarization.

12. Laser system according to claim 11, wherein in each of the solid bodies both partial radiation fields have the same polarization.

13. Laser system according to claim 1, wherein the first partial radiation field for each solid body disposed in the laser radiation field guide originates from one pumping radiation source.

14. Laser system according to claim 1, wherein the second partial radiation field for each solid body disposed in the laser radiation field guide originates from one pumping radiation source.

15. Laser system according to claim 1, wherein the two partial radiation fields entering the respective solid body originate from the same pumping radiation source.

16. Laser system according to claim 15, wherein the two partial radiation fields for in each case at least two of the solid bodies originate from the same pumping radiation source.

17. Laser system according to claim 16, wherein it has two pumping units, each of which pumps at least two solid bodies with partial radiation fields from the same pumping radiation source.

18. Laser system according to claim 13, wherein all the partial radiation fields fed into the at least two solid bodies originate from a single pumping radiation source.

19. Laser system according to claim 1, wherein the division of the pumping radiation into partial radiation fields takes place by means of polarizers with polarization-dependent transmission and reflection.

20. Laser system according to claim 1, wherein the adjustable division of the pumping power into the partial radiation fields takes place by means of the relative adjustment between a polarizer with polarization-dependent transmission and reflection and an adjustable polarization-influencing element.

21. Laser system according to claim 1, wherein the partial radiation fields are fed into the respective solid bodies via folding mirrors of the resonator.

22. Laser system according to claim 1, wherein the at least two solid bodies are formed identically.

23. Laser system according to claim 1, wherein the at least two solid bodies are disposed in relation to the laser radiation field in such a way that compensation for astigmatism caused by the respective thermal lens takes place.

24. Laser system according to claim 23, wherein in each case two of the solid bodies form a compensation pair and in that the two solid bodies are disposed in relation to the laser radiation field in such a way that compensation for the astigmatism caused by their respective thermal lens takes place.

25. Laser system according to claim 24, wherein the solid bodies of a compensation pair are rotated with the principal axes of the astigmatism by 90° with respect to one another.

26. Laser system according to claim 23, wherein the polarizing direction of the amplifier radiation field is adapted to a principal axis of the polarization of the respective solid body.

27. Laser system according to claim 26, wherein the polarizing direction of the laser radiation field is aligned parallel to the principal axis of the polarization of the respective solid body.

28. Laser system according to claim 24, wherein the solid bodies of a compensation pair are disposed with their principal axes of the polarization rotated 90° with respect to one another.

29. Laser system according to claim 23, wherein each solid body is pumped by a first and a second partial radiation field, the polarizing direction of which is aligned parallel to a principal axis of the polarization of the respective solid body.

30. Laser system according to claim 1, wherein the at least two solid bodies are aligned in relation to the laser radiation field in such a way that compensation for a birefringence caused by the respective thermal lens takes place.

31. Laser system according to claim 30, wherein in each case two of the solid bodies form a compensation pair and in that the two solid bodies are disposed in relation to the laser radiation field in such a way that compensation for the respective thermal lens and the birefringence takes place.

32. Laser system according to claim 30, wherein the polarizing directions of the laser radiation field in one of the solid bodies are rotated by 90° in relation to the polarizing directions of the laser radiation field in the other of the solid bodies.

* * * * *